US006714266B1

United States Patent
Ueda et al.

(12) United States Patent
(10) Patent No.: US 6,714,266 B1
(45) Date of Patent: Mar. 30, 2004

(54) TRANSMISSION TYPE LIQUID CRYSTAL DISPLAY DEVICE (75) Inventors: Tohru Ueda, Fukuyama (JP); Yoshinori Higami, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 107 days.

(21) Appl. No.: 09/631,964

(22) Filed: Aug. 3, 2000

(30) Foreign Application Priority Data

Aug. 4, 1999 (JP) ............................................ 11-221055

(51) Int. Cl.[7] ............................................ G02F 1/1343
(52) U.S. Cl. ............................... 349/38; 349/43; 438/30
(58) Field of Search .......................... 349/38, 43; 438/30

(56) References Cited

U.S. PATENT DOCUMENTS

| | | | | |
|---|---|---|---|---|
| 5,483,366 A | * | 1/1996 | Atherton | 349/42 |
| 5,986,723 A | * | 11/1999 | Nakamura et al. | 349/39 |
| 6,078,366 A | * | 6/2000 | Dohjo et al. | |
| 6,201,584 B1 | * | 3/2001 | Sonehara et al. | 345/55 |

FOREIGN PATENT DOCUMENTS

| | | |
|---|---|---|
| JP | 1-156725 | 6/1989 |
| JP | 4-194823 A | 7/1992 |
| JP | 4-307520 | 10/1992 |
| JP | 4-307521 | 10/1992 |
| JP | 8-136931 A | 5/1996 |
| JP | 10-206889 | 8/1998 |
| JP | 11-183934 | 7/1999 |
| JP | 2000-353807 | 12/2000 |
| JP | 11-125841 | 6/2001 |

OTHER PUBLICATIONS

Japanese Office Action dated Aug. 15, 2003.

* cited by examiner

*Primary Examiner*—Robert H. Kim
*Assistant Examiner*—P. R. Akkapeddi
(74) *Attorney, Agent, or Firm*—Nixon & Vanderhye P.C.

(57) ABSTRACT

In a transmission type liquid crystal display device, a semiconductor thin film is formed for each pixel below a signal wiring, a gate wiring, an auxiliary capacitance wiring and a lead electrode which are made of a light shading material via an insulating film. A region that belongs to the semiconductor thin film and is located below the signal wiring and below the gate wiring is made to serve as a channel region of a TFT. Regions that belong to the semiconductor thin film and are located on both sides of the channel region below the signal wiring are made to serve as a source region and a drain region of the TFT, respectively. Further, a region that belongs to the semiconductor thin film and is located below the auxiliary capacitance wiring is made to serve as an auxiliary capacitance electrode region. The TFT is effectively shaded without impairing the opening ratio of the transmission type liquid crystal display device with a simple construction, and the transmission type liquid crystal display device is fabricated with a high yield at low cost through a short process.

1 Claim, 8 Drawing Sheets

TRANSMISSION TYPE LIQUID CRYSTAL DISPLAY DEVICE

BACKGROUND OF THE INVENTION

The present invention relates to a transmission type liquid crystal display device.

Conventionally, in accordance with improvement in resolution of the transmission type liquid crystal display device, there have been proposed a variety of structures for effectively shading light without impairing an opening ratio of the liquid crystal display device in order to prevent a reduction in contrast due to malfunction ascribed to a photoelectric current and leak of light from the semiconductor layer of a thin film transistor that serves as a switching element.

Figure 8:
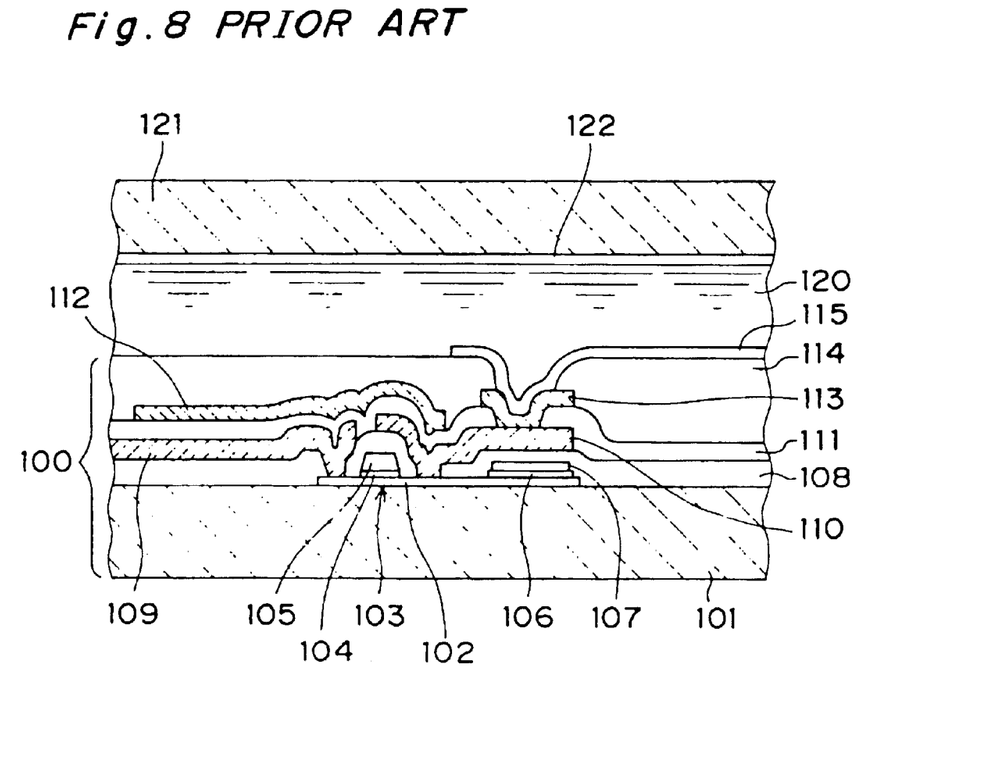
FIG. 8 is a schematic sectional view of an essential part of a conventional transmission type liquid crystal display device.

As a typical transmission type liquid crystal display device, there is the one shown in FIG. 8 (Japanese Patent Laid-Open Publication No. HEI 9-43639). As shown in FIG. 8, this transmission type liquid crystal display device is constructed of a transparent drive substrate 101 and an opposite substrate 121 that are bonded to each other with interposition of a specified gap, and liquid crystals 120 are held in this gap.

The opposite substrate 121 is located on thie incident side of the liquid crystal display device, and an opposite electrode 122 is provided on the drive substrate 101 side. The drive substrate 101 is located on the radiating side and includes a group of pixels each constructed of a pixel electrode 115 and a switching element 103 on the drive substrate 101 and a black matrix for shading an unopened portion of individual pixels from light incident on the incident side. The black matrix is constructed of two layers of a mask light shading pattern 112 and a pad light shading pattern 113, which are patterned to overlap each other to complemertarily shade incident light. For example, an upper layer is made of titanium (Ti), while the lower layer is made of aluminum (Al).

The drive substrate 101 is constructed of an upper layer, an intermediate layer and a lower layer. The upper layer includes the pixel electrode 115. The lower layer includes the switching element 103 for driving each pixel electrode 115, a gate wiring (not shown) for scanning the rows of the switching elements 103 and a signal wiring (not shown) for supplying a specified image signal to the switching elements 103 of each column.

The switching element 103 is constructed of a thin film transistor (referred to as TFT hereinafter) that has a semiconductor thin film 102 made of polycrystal silicon or the like as an active layer. A gate electrode 105 is formed on the transistor via a gate insulating film 104. The gate electrode 105 leads to the gate wiring. The TFT that serves as the switching element 103 is provided with a source region and a drain region on both sides of the gate electrode 105. One lead electrode 109 is connected to the source region of the semiconductor thin film 102, and the lead electrode 109 leads to a signal wiring (not shown) The other lead electrode 110 is connected to the drain region of the semiconductor thin film 102.

Further, the semiconductor thin film 102 is also provided with an auxiliary capacitance. This auxiliary capacitance includes the semiconductor thin film 102 that serves as one electrode and an auxiliary capacitance wiring 107 that serves as the other electrode via an insulating film 106. The gate electrode 105, the gate wiring and the auxiliary capacitance wiring 107 are constructed of a same layer and insulated from the lead electrodes 109, 110 by a first interlayer insulating film 108.

Then, bisected light shading patterns 112, 113 exist in the intermediate layer. One light shading pattern 112 is continuously patterned along the direction of row of the pixels and at least partially shades light to the switching element 103 while being vertically held by a second interlayer insulating film 111 and a flattening film 114 so as to be insulated from the lower layer and the upper layer. The other light shading pattern 113 is discretely patterned to be interposed between the pixel electrode 115 and the lead electrode 110, so that the light shading pattern 113 is for good electrical connection between both the electrodes as well as light shading. The lead electrode 110 is formed of a layer identical to that of the signal wiring and electrically connected to the drain region of the semiconductor thin film 102.

In the above-mentioned transmission type liquid crystal display device, no light shading is needed if a metal or silicide is used for the gate wiring, gate electrode 105, auxiliary capacitance wiring 107, signal wiring and lead electrodes 109, 110. However, the semiconductor layer of the TFT formed of the semiconductor thin film 102 is required to be completely shaded from light due to the light transmission of the semiconductor layer. Therefore, in order to completely shade the region to be shaded from light in the lower layer by the light shading patterns 112, 113, the light shading patterns are required to be formed jutting out of the region (semiconductor layer of TFT) to be shaded from light taking variations in alignment and line width through the patterning process into consideration. The opening ratio is reduced by an area of the jut region, and this causes a problem that brightness of the liquid crystal display device is reduced.

Furthermore, due to the necessity of the film formation of the light shading patterns, the process is prolonged and the structure becomes complicated, disadvantageously leading to a factor of yield reduction and cost increase. Specifically, there are needed the processes of forming the interlayer insulating films, light shading patterns and contact holes.

Figure 9:
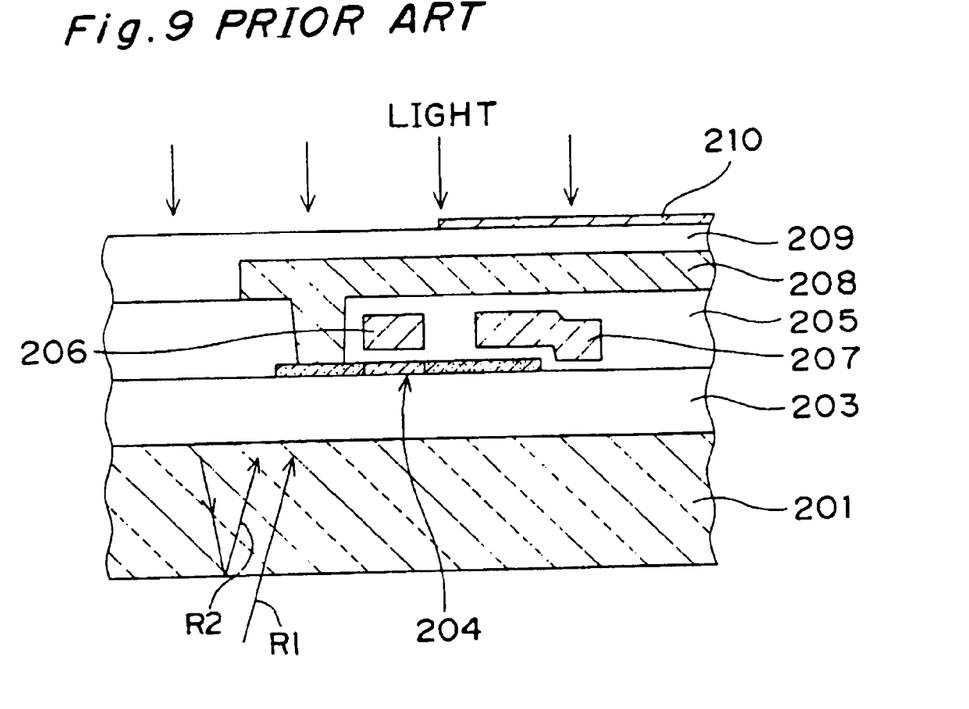
FIG. 9 is a schematic sectional view of an essential part of another conventional transmission type liquid crystal display device.

FIG. 9 shows a sectional view of the essential part of another conventional transmission type liquid crystal display device, in which a lower layer insulating film 203, a TFT 204, a first interlayer insulating film 205, a gate electrode 206, an auxiliary capacitance wiring 207, a signal wiring 208, a second interlayer insulating film 209 and a pixel electrode 210 are successively formed on a transparent substrate 201. With regard to the above transmission type liquid crystal display device, light comes from the above and goes out downward in FIG. 9. A reflected light R1 from an optical system on the radiating side may be incident on the TFT 204, and a reflected light R2 caused by reflection of a transmitted light on the lower surface of the transparent substrate 201 may be incident on the TFT 204. This leads to a problem that the reflected lights R1 and R2 are incident on the TFT to cause an optical leak current when the TFT is turned off in accordance with the dimensional reduction of pixels in company with the improvement in resolution.

SUMMARY OF THE INVENTION

An object of the present invention is to provide a transmission type liquid crystal display device that can cope with an improvement in resolution by effectively shading light without impairing a opening ratio and by shading a rear surface reflection light, the device being able to be fabricated with a simple construction and high yield at low cost through a short process.

In order to achieve the above-mentioned object, the present invention provides a transmission type liquid crystal display device including on a transparent substrate a gate wiring; a signal wiring perpendicular to the gate wiring, an auxiliary capacitance wiring that is generally parallel to the gate wiring and perpendicular to the signal wiring, a thin film transistor having either one of a source region and a drain region connected to the signal wiring, and a pixel electrode to which the other one of the source region and the drain region of the thin film transistor is connected via a lead electrode, wherein the signal wiring, the gate wiring, the auxiliary capacitance wiring and the lead electrode are made of a light shading material, a semiconductor thin film is formed for each pixel electrode below the signal wiring, the gate wiring, the auxiliary capacitance wiring and the lead electrode via an insulating film, a region that belongs to the semiconductor thin film and is located below the signal wiring and below the gate wiring is made to serve as a channel region of the thin film transistor, regions that belong to the semiconductor thin film and are located on both sides of the channel region below the signal wiring are made to serve as a source region and a drain region of the thin film transistor respectively, and a region that belongs to the semiconductor thin film and is located below the auxiliary capacitance wiring is made to serve as an auxiliary capacitance electrode region.

According to the transmission type liquid crystal display device of the present invention, the gate wiring, the signal wiring, the auxiliary capacitance wiring and the lead electrode are formed of a light shading material. Therefore, the channel region of the TFT, which is located below the signal wiring and below the gate wiring, is shaded from incident light. The source region and the drain region of the TFT, which are located on both sides of the channel region below the signal wiring, are also shaded from incident light. Accordingly, the TFT is entirely shaded from incident light. Since the gate wiring, the signal wiring, the auxiliary capacitance wiring and the lead electrode are made of the light shading material, it is not necessary to form a light shading film for shading the TFT. This allows the a transmission type liquid crystal display device to be fabricated at low cost and with high yield. Light shading of the TFT is effectively achieved with a simple construction without impairing the opening ratio of a liquid crystal display.

In an embodiment of the invention, a jut region of the semiconductor thin film in which juts from the signal wiring, the gate wiring, the auxiliary capacitance wiring and the lead electrode has an areal ratio of 0.1 or less with respect to an area of an opening through which light is transmitted.

According to the transmission type liquid crystal display device of the above embodiment, it is preferred that the semiconductor thin film be completely covered. However, even if the semiconductor thin film juts over the opening through which light is transmitted, the jut region of the semiconductor thin film cannot be visually distinguished by human beings so long as the jut region has an area of not greater than 10% of the total area of the opening.

In an embodiment of the invention, the transmission type liquid crystal display device further comprises a lower layer light shading film formed below the semiconductor thin film and on the transparent substrate so as to cover a region that includes at least the channel region of the thin film transistor of the semiconductor thin film.

According to the transmission type liquid crystal display device of the above embodiment, the rear surface reflection light to the TFT is obstructed by forming the lower layer light shading film below at least the channel region, the source region and the drain region of the TFT in the semiconductor thin film via the insulating film.

In an embodiment of the invention, the lower layer light shading film is formed on the transparent substrate so as to cover a region located between the gate wiring and the auxiliary capacitance wiring.

According to the transmission type liquid crystal display device of the above embodiment, the region between the gate wiring and the auxiliary capacitance wiring is shaded by the lower layer light shading film.

In an embodiment of the invention, the transmission type liquid crystal display device further comprises a first contact hole for connecting either one of the source region and the drain region of the semiconductor thin film to the signal wiring, a second contact hole for connecting the other one of the source region and the drain region of the semiconductor thin film to the lead electrode, and a third contact hole for connecting the lead electrode to the pixel electrode, the signal wiring being electrically connected to the pixel electrode via the first contact hole, the source region, the channel region, the drain region, and the auxiliary capacitance electrode region of the semiconductor thin film, the second contact hole, the lead electrode and the third contact hole.

According to the transmission type liquid crystal display device of the above embodiment, if the above-mentioned TFT is turned on, then the potential of the signal wiring is applied to the pixel electrode via the first contact hole, the source region, the channel region, the drain region and the auxiliary capacitance electrode region of the semiconductor thin film, the second contact hole, the lead electrode and the third contact hole. Then, the potential of the pixel electrode is retained in the capacitance formed by holding liquid crystals between the pixel electrode and the opposite electrode (located on the opposite substrate side), and the potential of the pixel electrode is retained in the auxiliary capacitance formed by holding the insulating film that serves as a dielectric film between the auxiliary capacitance wiring and the auxiliary capacitance electrode region of the semiconductor thin film.

In an embodiment of the invention, the gate electrode and the auxiliary capacitance wiring are made of a same material.

According to the transmission type liquid crystal display device of the above embodiment, the gate wiring and the auxiliary capacitance wiring of the same material is formed, so there can be obtained a simple construction in which the gate wiring and the auxiliary capacitance wiring can be formed in a same layer through a same process.

In an embodiment of the invention, the signal wiring and the lead electrode are made of a same material.

According to the transmission type liquid crystal display device of the above embodiment, the signal wiring and the lead electrode of the same material is formed, so there can be obtained a simple construction in which the signal wiring and the lead electrode can be formed in a same layer through a same process.

In an embodiment of the invention, the lead electrode is a thin film whose a principal component is Al, and a film layer which contains at least one substance selected from among Ir, Ru, Cr, Co, Ta, Ti, W, Mo, TiW alloy, WN, TiN and a silicide of Ir, Cr, Co, Ta, Ti, W and Mo is laminated on the lead electrode According to the transmission type liquid crystal display device of the above embodiment, the film layer containing at least one substance selected from among Ir, Ru, Cr, Co, Ta, Ti, W, Mo, TiW alloy, WN, TiN and the silicide of Ir, Cr, Co, Ta, Ti, W and Mo is laminated on the lead electrode whose a principal component is Al. Therefore, the pixel electrode which is made of a transparent oxide such as ITO (indium-tin-oxide) does not directly contacts the Al thin film of the lead electrode, and thereby Al oxide is not formed at an interface between the lead electrode and the pixel electrode, allowing good electrical connection between the lead electrode and the pixel electrode to be obtained.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A transmission type liquid crystal display device of the present invention will be described in detail below on the basis of embodiments thereof shown in the drawings.

Figure 1:
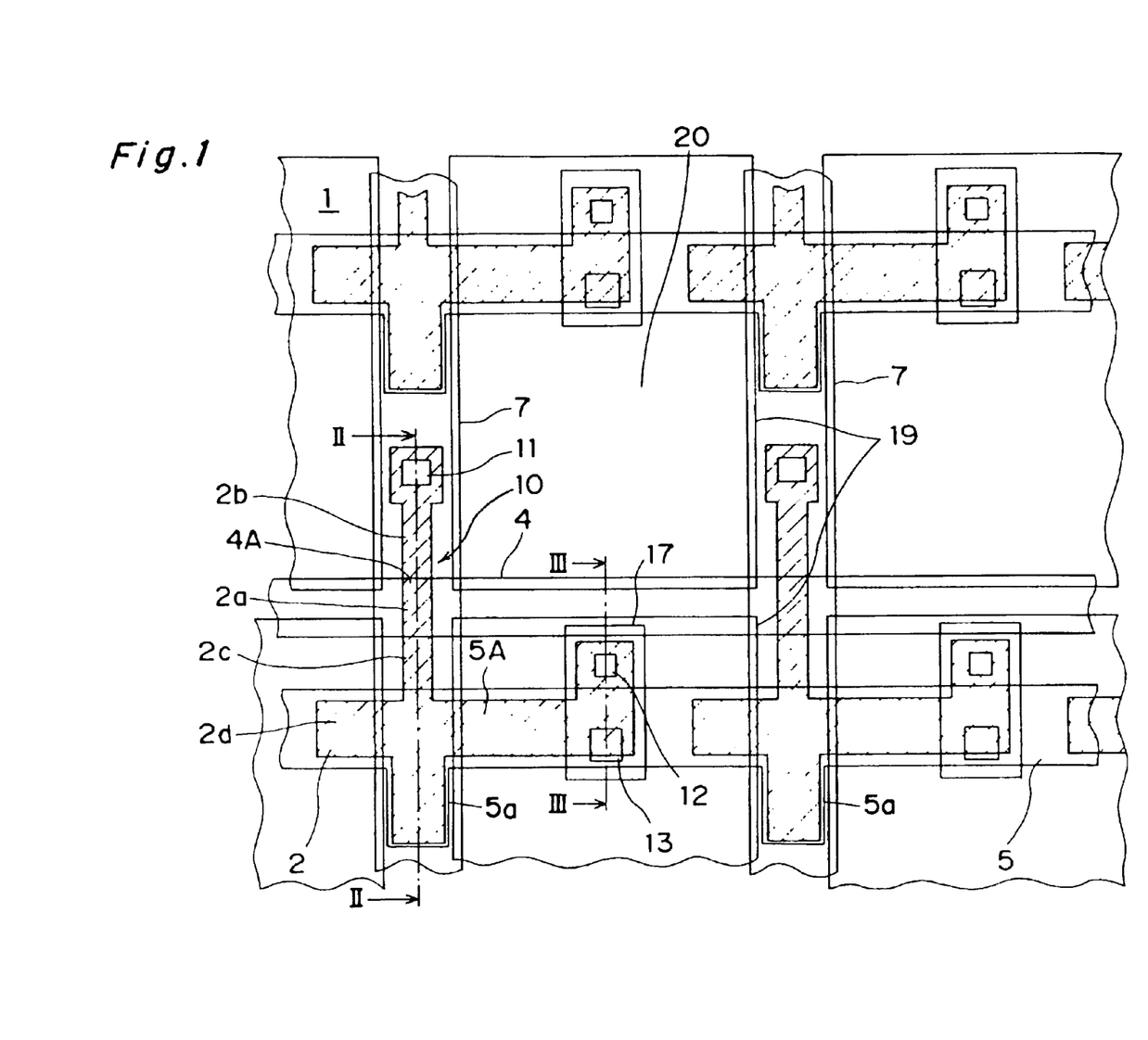
FIG. 1 is a schematic plan view of an essential part of a transmission type liquid crystal display device according to a first embodiment of the present invention.

FIG. 1 is a schematic plan view of an essential part of a transmission type liquid crystal display device according to a first embodiment of the present invention. As shown in FIG. 1, this transmission type liquid crystal display device includes a plurality of gate wiring lines 4 (only one is shown in FIG. 1) arranged generally parallel to one another, a plurality of signal wiring lines 7 that are arranged generally parallel to one another so as to be perpendicular to the gate wiring lines 4, a plurality of auxiliary capacitance wiring lines 5 arranged generally parallel to the gate wiring lines 4 between the gate wiring lines 4, a plurality of TFT's 10 whose source regions 2b are connected to the signal wiring lines 7 and a plurality of pixel electrodes 19 connected to the drain regions 2c of the TFT's 10 via lead electrodes 17, the elements being formed on a transparent substrate 1. The auxiliary capacitance wiring 5 has a region 5a that extends downward along the signal wiring 7 in FIG. 1.

The signal wiring lines 7, gate wiring lines 4, auxiliary capacitance wiring lines 5, and lead electrodes 17 are made of a light shading material. A plurality of polycrystal silicon films 2 that serve as semiconductor thin films are formed on the transparent substrate 1 for each pixel so as to be below the signal wiring 7, gate wiring 4, auxiliary capacitance wiring 5, and lead electrode 17. Then, a region that belongs to the polycrystal silicon film 2 and is located below the signal wiring 7 and below the gate wiring 4 is made to serve as a channel region 2a of the TFT 19. Regions that belong to the polycrystal silicon film 2 and are located on both sides of the channel region 2a are made to serve as a source region 2b and a drain region 2c of the TFT 10. Further, a region that belongs to the polycrystal silicon film 2 and is located below the auxiliary capacitance wiring 5 is made to serve as an auxiliary capacitance electrode region 2d. The channel region 2a, source region 2b and drain region 2c of the polycrystal silicon film 2 are shaded from light by the signal wiring 7 and the gate wiring 4, while the auxiliary capacitance electrode region 2d of the polycrystal silicon film 2 is shaded from light by the auxiliary capacitance wiring 5 and the signal wiring 7.

The signal wiring 7 and the source region 2b are connected to each other via a first contact hole 11. The auxiliary capacitance electrode region 2d led to the drain region 2c and the lead electrode 17 are connected to each other via a second contact hole 12. A pixel electrode 19 and the lead electrode 17 are connected to each other via a third contact hole 13.

FIGS. 2A through 2D are views showing fabricating processes of a cross-sectional portion taken along line II—II of FIG. 1, while FIGS. 3A through 3D are views showing the fabricating processes of a cross-sectional portion taken along line III—III of FIG. 1. A fabricating method of the aforementioned transmission type liquid crystal display device will be described with reference to FIGS. 2A to and FIG. 3.

First of all, as shown in FIGS. 2A to 2D and FIGS. 3A to 3D, amorphous silicon is deposited to a thickness of about 75 nm on the transparent substrate 1 made of glass or quartz by the low pressure CVD (chemical vapor deposition) method. Then, the deposited silicon is subjected to a heating process at a temperature of 600° C. for 24 hours in an $N_2$ atmosphere so as to be crystallized into polycrystal silicon and thereafter patterned into an island-like shape, forming a polycrystal silicon film 2.

Figure 2A:
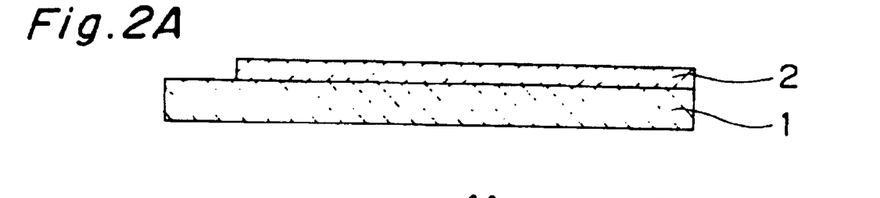
FIGS. 2A through 2D are views showing fabricating processes of a cross-sectional portion taken along line II—II of FIG. 1.
Figure 2B:
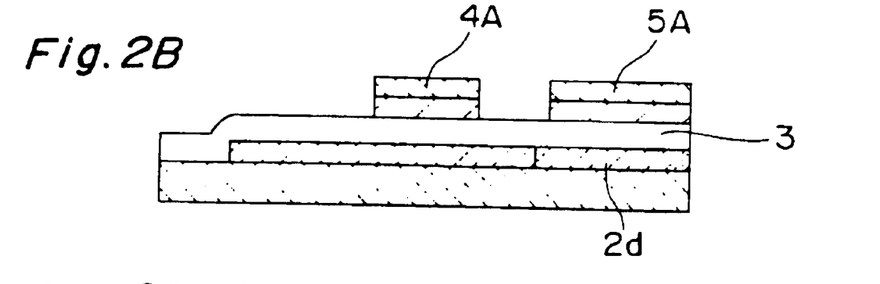
Figure 3A:
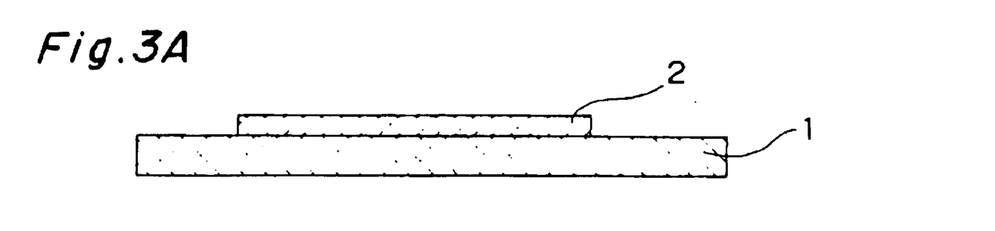
FIGS. 3A through 3D are views showing the fabricating processes of a cross-sectional portion taken along line III—III of FIG. 1.
Figure 3B:
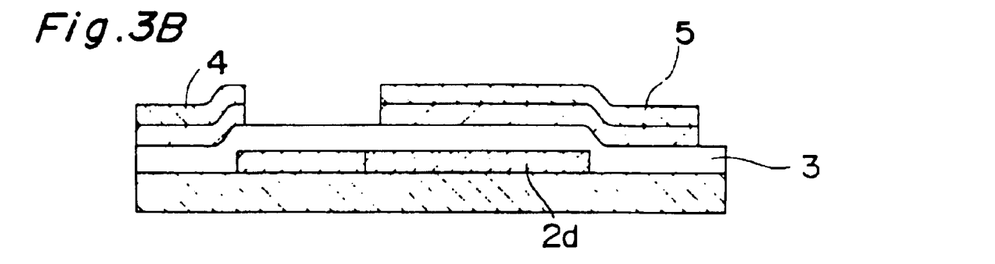

Next, as shown in FIG. 2B and FIG. 3B, phosphorus ions are implanted into the auxiliary capacitance electrode region 2d on the polycrystal silicon film 2. Next, an $SiO_2$ film of a thickness of about 80 nm is formed by the low pressure CVD method, forming a gate insulating film 3. Next, a gate wiring 4 (including a gate electrode portion 4A) and an auxiliary capacitance wiring 5 (including an auxiliary capacitance electrode portion 5A) are concurrently formed on the gate insulating film 3. The gate wiring 4 and the auxiliary capacitance wiring 5 are constructed of a laminate of a polycrystal silicon film and a WSi layer. The polycrystal silicon film has a thickness of about 150 nm and is doped with an impurity, and the WSi layer has a thickness of about 150 nm laminated on the polycrystal silicon film. In place of the laminate structure of WSi and polycrystal silicon, it is acceptable to employ a metal film of Cr, W, Mo, Ta, Ti or the like or a silicide film of the metal or a laminate structure (the so-called polycide) having polycrystal silicon below the metal film or the silicide film. If impurity activating annealing described later is performed at low temperature or locally by means of laser or the like, a material having a principal component of Al (AlSi, AlCu, AlSiCu or the like) can be employed.

Figure 2C:
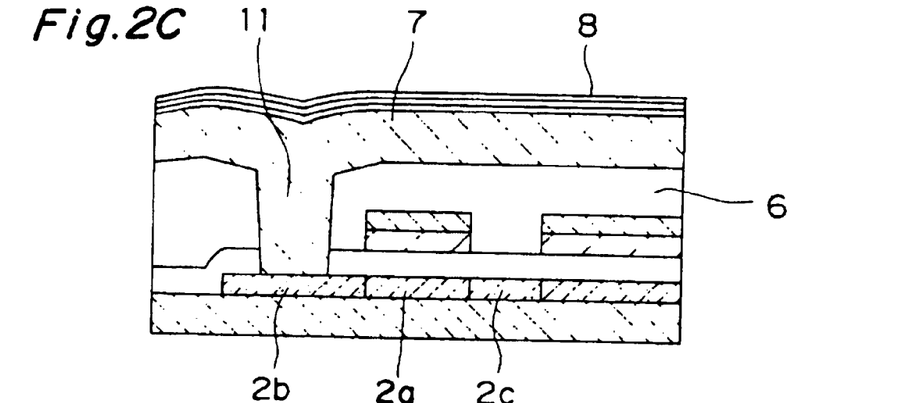
Figure 2D:
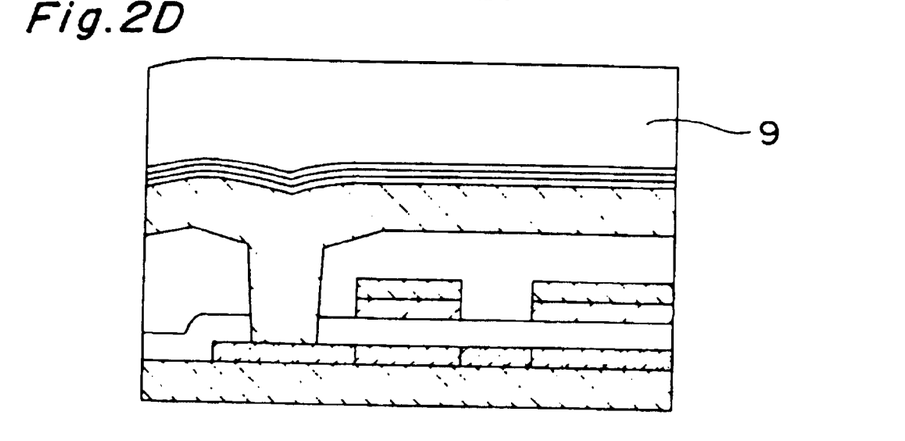
Figure 3C:
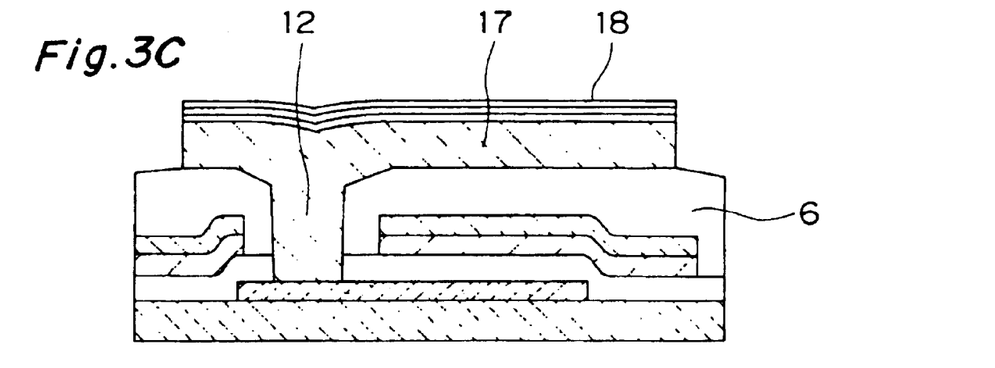
Figure 3D:
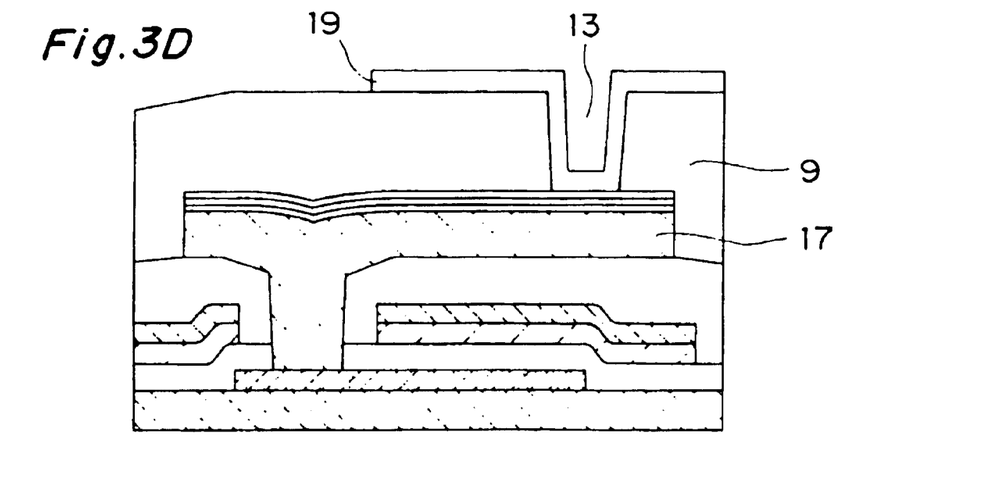

Next, as shown in FIG. 2C and FIG. 3C, phosphorus ions are implanted into the source region 2b and the drain region 2c of the polycrystal silicon film 2. Next, BPSG (borophospho silicate glass) is deposited to a thickness of about 600 nm by the normal pressure CVD method, forming a first interlayer insulating film 6. After a heating process (950° C., 30 minutes) for activating the implanted impurity ions, contact holes 11, 12 that reach the polycrystal silicon film 2 are each formed. Next, TiN and Al having thicknesses of 150 nm and 400 nm, respectively, are deposited by the sputtering method and thereafter patterned to form a signal wiring 7 and a lead electrode 17. In this case, the signal wiring 7 and the lead electrode 17 have a principal component of Al exemplified by AlSi, AlCu, AlSiCu or the like. In place of Al, it is acceptable to employ a metal film of Cu, Cr, W, Mo, Ta, Ti or the like capable of shading light, a silicide film of the metal or a laminate structure having polycrystal silicon below the layers of the metal film or the silicide film. A barrier metal 18 (laminated with Al) located between pixel electrode 19 of ITO (indium-tin-oxide) and a lead electrode 17 of Al may be formed by laminating a layer made of at least one substance selected from among Ir, Ru, Cr, Co, Ta, Ti, W, Mo, TiW alloy, WN, TiN and a silicide of Ir, Cr, Co, Ta, Ti, W and Mo. An $SiO_2$ film having a thickness of about 600 nm is formed on the laminate by the plasma CVD method, forming a second interlayer insulating film 9. Then, a contact hole 13 that reaches the lead electrode 17 is opened on the second interlayer insulating film 9. Next, ITO is deposited to a thickness of 150 nm by the sputtering method and thereafter patterned to form the pixel electrode 19.

As described above, light shading can be effectively achieved with a simple construction without impairing the opening ratio by employing the gate wiring 4, signal wiring 7, auxiliary capacitance wiring 5 and lead electrode 17 which are formed of a light shading material, as the light shading film. Furthermore, this can eliminate the process for separately forming a light shading film and simplify the fabricating processes, therefore allowing a transmission type liquid crystal display device to be fabricated with high yield at low cost.

If the TFT 10 is turned on, then a potential of the signal wiring 7 is applied to the pixel electrode 19 via the first contact hole 11, the source region 2b, the channel region 2a, the drain region 2c and the auxiliary capacitance electrode region 2d of the semiconductor thin film 2, the second contact hole 12, the lead electrode 17 and the third contact hole 13. Consequently, the potential of the pixel electrode 19 is retained in the capacitance formed by holding liquid crystals between the pixel electrode 19 and an opposite electrode (not shown) located on the opposite substrate side, and the potential of the pixel electrode 19 is retained in the auxiliary capacitance formed by holding the gate insulating film 3 that serves as a dielectric film between the auxiliary capacitance wiring 5 and the auxiliary capacitance electrode region 2d of the semiconductor thin film 2.

By forming the gate wiring 4 and the auxiliary capacitance wiring 5 of a same material, there can be obtained a simple construction in which the gate wiring 4 and the auxiliary capacitance wiring 5 can be formed in a same layer through a same process.

By forming the signal wiring 7 and the lead electrode 17 of a same material, there can be obtained a simple construction in which the signal wiring 7 and the lead electrode 17 can be formed in a same layer through a same process.

By laminating a layer containing at least one substance selected from among Ir, Ru, Cr, Co, Ta, Ti, W, Mo, TiW alloy, WN, TiN and a silicide of Ir, Cr, Co, Ta, Ti, W and Mo on the lead electrode 17 that has a principal component of Al, Al oxide is not formed at an interface between the lead electrode 17 and the pixel electrode 19. Therefore, good electrical connection can be obtained between the lead electrode 17 and the pixel electrode 19.

Figure 4:
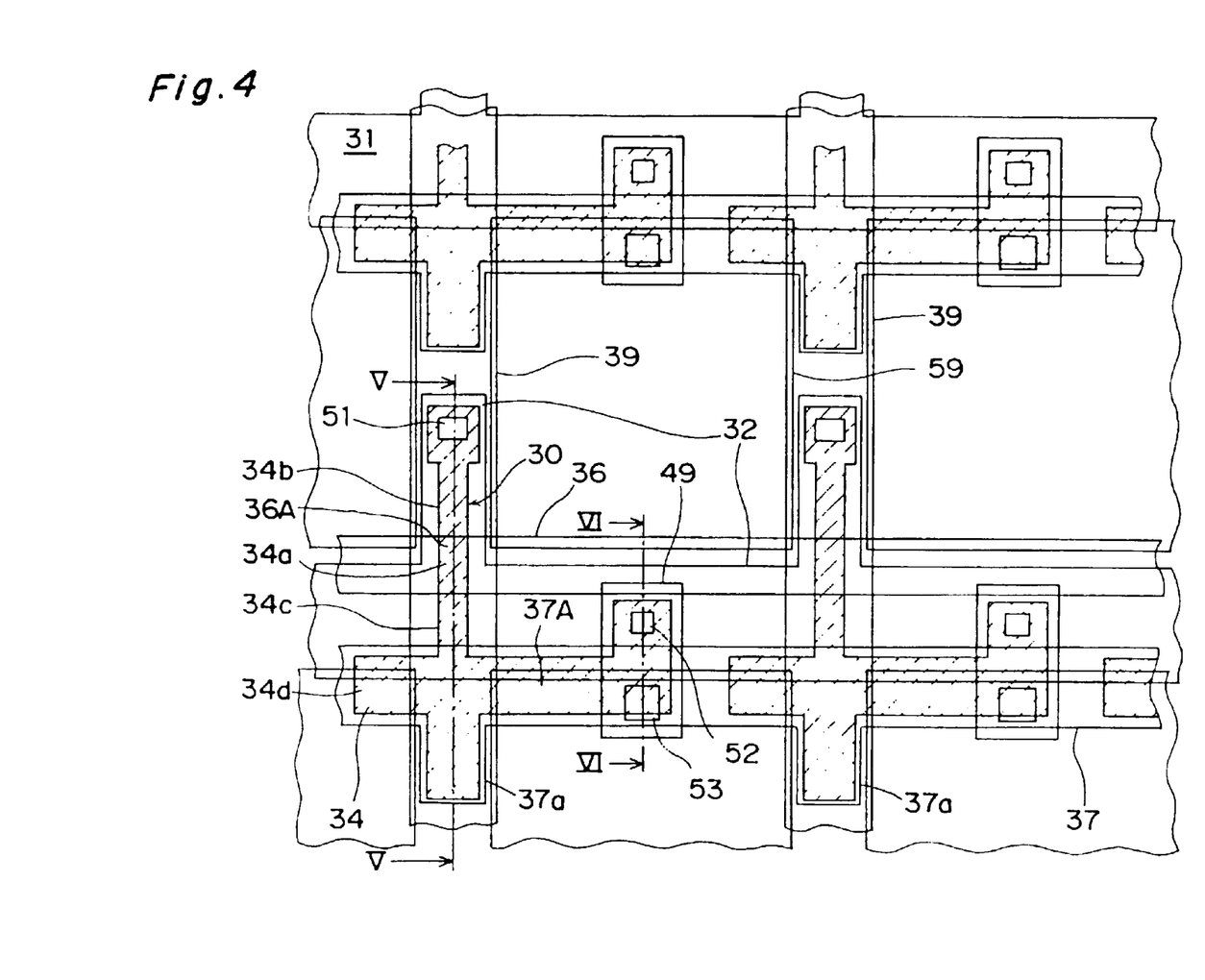
FIG. 4 is a schematic plan view of the essential part of a transmission type liquid crystal display device according to a second embodiment of the present invention.

FIG. 4 is a schematic plan view of an essential part of a transmission type liquid crystal display device according to a second embodiment of the present invention. As shown in FIG. 4, on a transparent substrate 31, this transmission type liquid crystal display device includes a plurality of gate wiring lines 36 (only one is shown in FIG. 4) arranged generally parallel to one another, a plurality of signal wiring lines 39 that are arranged generally parallel to one another so as to be perpendicular to the gate wiring lines 36, a plurality of auxiliary capacitance wiring lines 37 arranged generally parallel to the gate wiring lines 36 between the gate wiring lines 36, a plurality of TFT's 30 whose source regions 34b are connected to the signal wiring lines 39 and a plurality of pixel electrodes 59 connected to the drain regions 34c of the TFT's 30 via lead electrodes 49. The auxiliary capacitance wiring 37 has a region 37a that extends downward along the signal wiring 39 in FIG. 4.

The signal wiring 39, gate wiring 36, auxiliary capacitance wiring 37 and lead electrode 49 are made of a light shading material. A plurality of polycrystal silicon films 34 that serve as semiconductor thin films are formed for each pixel below the signal wiring 39, gate wiring 36, auxiliary capacitance wiring 37 and lead electrode 49 on the transparent substrate 31. Then, a region that belongs to the polycrystal silicon film 34 and is located below the signal wiring 39 and below the gate wiring 36 is made to serve as a channel region 34a of the TFT 30, regions that belong to the polycrystal silicon film 34 and are located on both sides of the channel region are made to serve as a source region 34b and a drain region 34c of the TFT 30. A region that belongs to the polycrystal silicon film 34 and is located below the auxiliary capacitance wiring 37 is made to serve as an auxiliary capacitance electrode region 34d. The channel region 34a, source region 34b and drain region 34c of the polycrystal silicon film 34 are shaded from light by the signal wiring 39 and the gate wiring 36, while the auxiliary capacitance electrode region 34d of the polycrystal silicon film 34 is shaded from the light by the auxiliary capacitance wiring 37 and the signal wiring 39.

The signal wiring 39 and the source region 34b are connected to each other via a first contact hole 51. The auxiliary capacitance electrode region 34d led to a drain region 34c and the lead electrode 49 are connected to each other via a second contact hole 52. A pixel electrode 59 and the lead electrode 49 are connected to each other via a third contact hole 53. Then, a lower layer light shading film 32 including a region below each TFT 30 and a lower region between the gate wiring 36 and the auxiliary capacitance wiring 37 is formed.

Figure 5A:
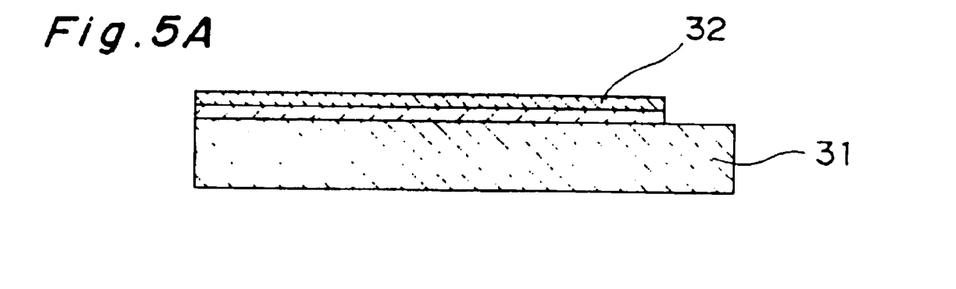
FIGS. 5A through 5C are views showing fabricating processes of a cross-sectional portion taken along line V—V of FIG. 4.
Figure 5B:
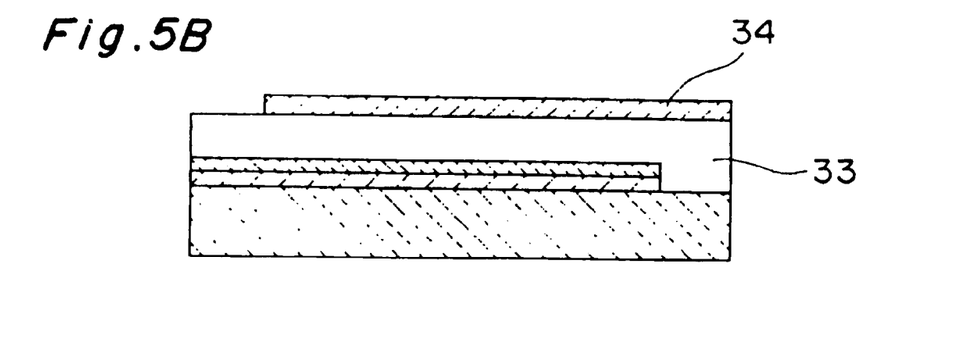
Figure 5C:
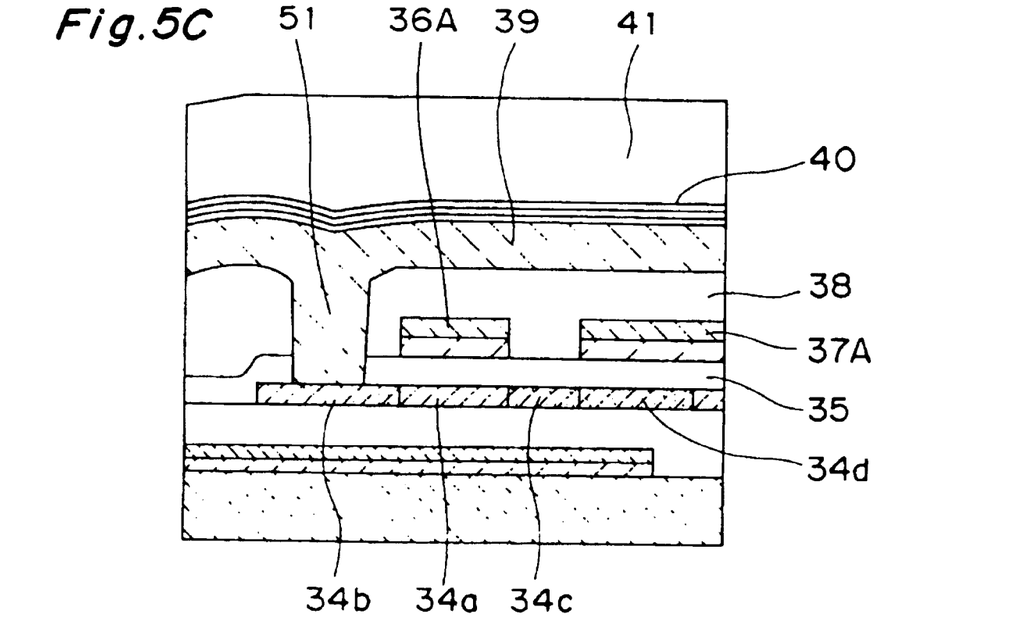
Figure 6A:
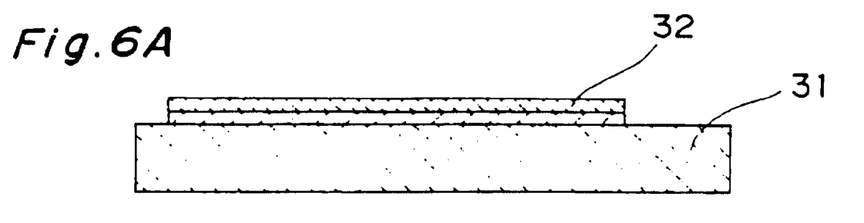
FIGS. 6A through 6C are views showing the fabricating processes of a cross-sectional portion taken along line VI—VI of FIG. 4.
Figure 6B:
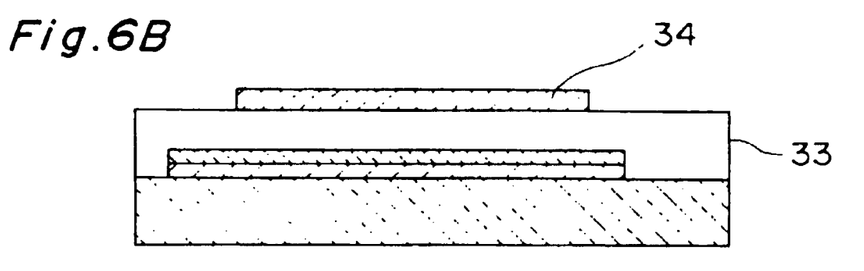
Figure 6C:
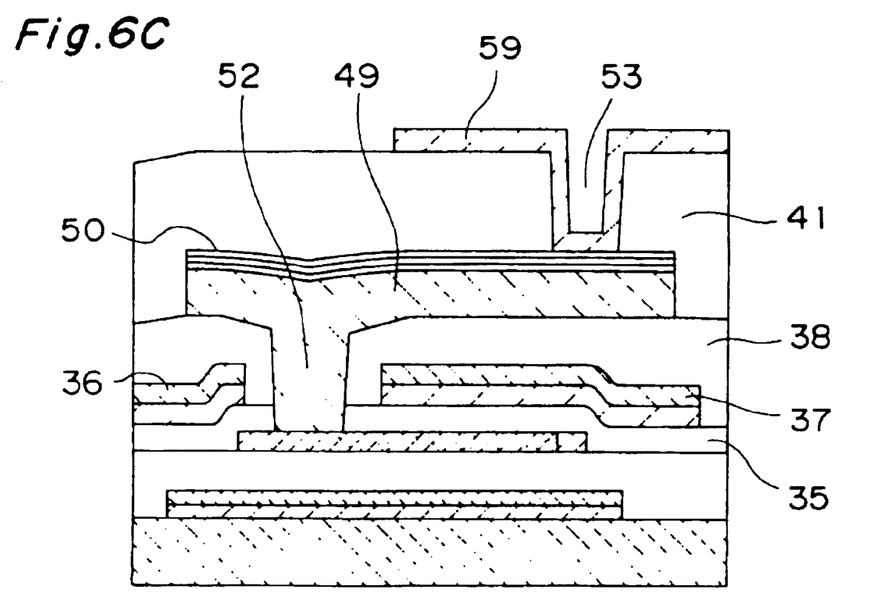

FIGS. 5A through 5C are views showing fabricating processes of a cross-sectional portion taken along line V—V of FIG. 4, while FIGS. 6A through 6C are views showing the fabricating processes of a cross-sectional portion taken along line VI—VI of FIG. 4. A fabricating method of the aforementioned transmission type liquid crystal display device will be described with reference to FIGS. 5A to 5C and FIGS. 6A to 6C. It is to be noted that the fabricating method of this transmission type liquid crystal display device is similar to the fabricating method of the first embodiment except for the lower layer light shading film 32 and the insulating film 33.

First of all, as shown in FIG. 5A and FIG. 6A, a polycrystal silicon film is deposited to a thickness of about 100 nm on the transparent substrate 31 made of glass or quartz by the low pressure CVD method. Subsequently, WSi is deposited to a thickness of about 100 nm and thereafter patterned to form the lower layer light shading film 32. In this second embodiment, a laminate structure of the polycrystal silicon film and WSi is provided for the lower layer light shading film 32. However, it is acceptable to employ a metal film of Cr, W, Mo, Ta, Ti or the like or a silicide film of the metal or a laminate structure (the so-called polycide) having polycrystal silicon below the metal film or the silicide film.

Next, as shown in FIG. 5B and FIG. 6B, $SiO_2$ is deposited to a thickness of about 500 nm on the entire surface of the transparent substrate 31 on which the lower layer light shading film 32 has been formed, consequently forming the insulating film 33.

Next, as shown in FIG. 5B and FIG. 6B, amorphous silicon is deposited to a thickness of about 75 nm on the insulating film 33 by the low pressure CVD method. Then, the silicon is subjected to a heating process at a temperature of 600° C. for 24 hours in an $N_2$ atmosphere so as to be crystallized into polycrystal silicon and thereafter patterned into an island-like shape, forming the polycrystal silicon film 34.

Next, as shown in FIG. 5C and FIG. 6C, phosphorus ions are implanted into the auxiliary capacitance electrode region 34d on the polycrystal silicon film 34 using a resist pattern as a mask. Next, an $SiO_2$ film is formed to a thickness of about 80 nm by the low pressure CVD method, forming the gate insulating film 35. Next, a gate wiring 36 (including a gate electrode portion 36A) and an auxiliary capacitance wiring 37 (including an auxiliary capacitance electrode portion, 37A) are concurrently formed on the gate insulating film 35. For the gate wiring 36 and the auxiliary capacitance wiring 37, there is used a laminate of a polycrystal silicon film that has a thickness of about 150 nm and is doped with an impurity and a WSi layer having a thickness of about 150 nm laminated on the polycrystal silicon film. It is acceptable to employ a metal film of Cr, W, Mo, Ta, Ti or the like or a silicide film of the metal or a laminate structure (the so-called polycide) having polycrystal silicon below the metal film or the silicide film in place of the laminate structure of WSi and polycrystal silicon. If impurity activating annealing described later is performed at low temperature or locally by means of laser or the like, a material having a principal component of Al (AlSi, AlCu, AlSiCu or the like) can be employed.

Next, phosphorus ions are implanted into the source region 34b and the drain region 34c of the polycrystal silicon film 34. Next, BPSG (boro-phospho silicate glass) is deposited to a thickness of about 600 nm by the normal pressure CVD method, forming a first interlayer insulating film 38. Then, after a heating process (950° C., 30 minutes) for activating the implanted impurity ions, contact holes 51, 52 that reach the polycrystal silicon film 34 are each formed. Next, TiN and Al having thicknesses of 150 nm and 400 nm, respectively, are deposited by the sputtering method and thereafter patterned to form a signal wiring 39 and a lead electrode 49. In this case, the signal wiring 39 and the lead electrode 49 have a principal component of Al exemplified by AlSi, AlCu, AlSiCu or the like. It is acceptable to employ a metal film of Cu, Cr, W, Mo, Ta, Ti or the like capable of shading light, a silicide film of the metal or a laminate of polycrystal silicon below the layers of the metal film or the silicide film in place of Al. For a barrier metal 50 (laminated with Al) located between ITO (pixel electrode 59) and Al (lead electrode 49), there may be a laminate containing at least one substance selected from among Ir, Ru, Cr, Co, Ta, Ti, W, Mc, TiW alloy, WN, TiN and a silicide of Ir, Cr, Co, Ta, Ti, W and Mo. An $SiO_2$ film having a thickness of about 600 is formed on the laminate by the plasma CVD method, forming a second interlayer insulating film 41. Then, a contact hole 53 that reaches the lead electrode 49 is opened on the second interlayer insulating film 41. Next, ITO is deposited to a thickness of 150 nm by the sputtering method and thereafter patterned to form the pixel electrode 59.

The transmission type liquid crystal display device of this second embodiment has effects similar to those of the transmission type liquid crystal display device of the first embodiment. By forming the lower layer light shading film 32 in the layer below the channel region 34a, source region 34b and drain region 34c of the TFT 30 of the semiconductor thin film 34 via the insulating film 33, there can be provided a transmission type liquid crystal display device capable of shading the rear surface reflection light and coping with an improvement in resolution.

In the aforementioned first and second embodiments, the polycrystal silicon film 2,34 is completely covered with the signal wiring 7,39, the gate wiring 4,36, the auxiliary capacitance wiring 5,37 and the lead electrode 17,49. However, the jut regions of the semiconductor thin film jutting from the signal wiring, gate wiring, auxiliary capacitance wiring and lead electrode may have an areal ratio of 0.1 or less to the respective openings with respect to the area of the each opening through which light is transmitted. In this case, it is impossible for human beings to visually distinguish whether or not the semiconductor thin film is jutting.

Figure 7:
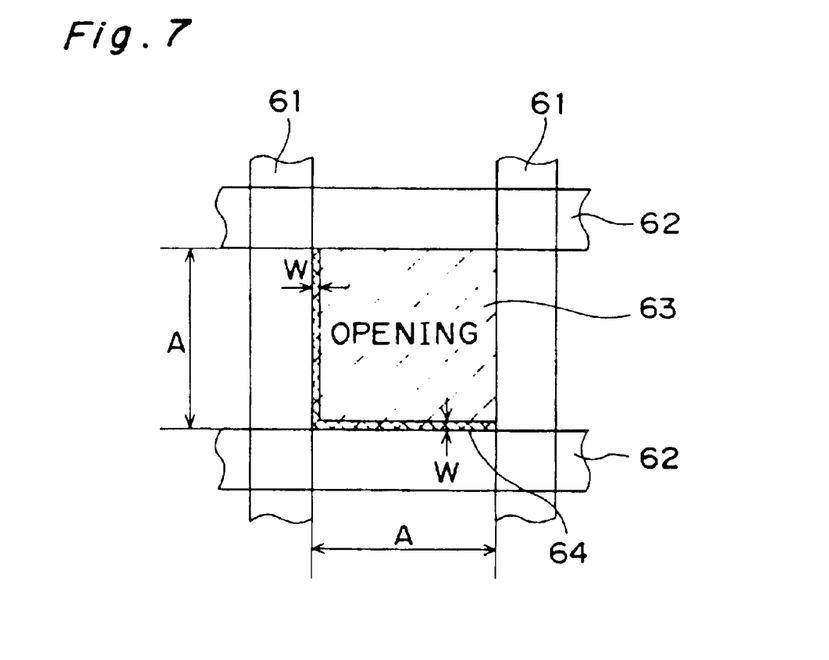
FIG. 7 is a view for explaining an opening and a jut region.

As shown in FIG. 7, assuming that the region of an opening 63 surrounded by a signal wiring 61 and a gate wiring 62 is a square (area $S=A^2$) having a side of A and there is a jut region 64 of a width W of the semiconductor thin film on two sides of the four sides, then the area of the jut region 64 of the semiconductor thin film becomes 2AW. If this area is not greater than 10% of the area S of the opening 63 through which light is transmitted, then there holds the expression of:

$$2AW/S = 2W/\sqrt{S} \leq 0.1 \ (=10\%)$$

and accordingly, the tolerated jut width W can be expressed by the expression of:

$$W \leq 0.05\sqrt{S}.$$

By setting the jut width W of the jut region 64 of the semiconductor thin film so as to satisfy this condition, it is impossible for human beings to visually distinguish whether or not the semiconductor thin film is jutting.

Although the aforementioned first and second embodiments have described the transmission type liquid crystal display device employing the TFT's 10, 30, it is acceptable to employ a TFT of LDD (lightly doped drain) type that has a lightly doped impurity region on both sides of a region corresponding to the gate electrode of the polycrystal silicon film and is able to reduce the OFF-state current. Furthermore, the present invention is not substantially changed even if a TFT having another structure capable of reducing the OFF-state current is employed.

As is apparent from the above, according to the transmission type liquid crystal display device of the present invention, there can be provided a liquid crystal display device capable of effectively shading light with a simple construction without impairing the opening ratio, allowing a transmission type liquid crystal display device to be fabricated with high yield at low cost through a short process. Furthermore, there can be provided a transmission type liquid crystal display device that can shade the rear surface reflection light without influencing the opening ratio, assuring sufficient brightness even with an improvement in resolution.

The invention being thus described, it will be obvious that the same may be varied in many ways. Such variations are not be regarded as a departure from the spirit and scope of the invention, and all such modifications as would be obvious to one skilled in the art are intended to be included within the scope of the following claims.

What is claimed is:

1. A transmission type liquid crystal display device comprising on a transparent substrate a gate wiring, a signal wiring perpendicular to the gate wiring, an auxiliary capacitance wiring that is generally parallel to the gate wiring and perpendicular to the signal wiring, a thin film transistor having either one of a source region and a drain region electrically connected to the signal wiring, and a pixel electrode to which the other one of the source region and the drain region of the thin film transistor is electrically connected via a lead electrode, wherein the signal wiring, the gate wiring, the auxiliary capacitance wiring and the lead electrode are made of light shading material(s), a semiconductor thin film is formed for a pixel electrode below and so as to be entirely covered by respective parts of the signal wiring, the gate wiring, the auxiliary capacitance wiring and the lead electrode, a region of the semiconductor thin film located below and entirely covered by the signal wiring and below and at least partially covered by the gate wiring serves as a channel region of the thin film transistor, regions of the semiconductor thin film located on both sides of the channel region below the signal wiring serve as a source region and a drain region of the thin film transistor respectively, and a region of the semiconductor thin film located below the auxiliary capacitance wiring serves as an auxiliary capacitance electrode region; and a first contact hole for electrically connecting either one of the source region and the drain region of the semiconductor thin film to the signal wiring, a second contact hole for electrically connecting the other one of the source region and drain region of the semiconductor thin film to the lead electrode, and a third contact hole for electrically connecting the lead electrode to the pixel electrode.

* * * * *